United States Patent
Zimmerman

(10) Patent No.: US 10,701,308 B2
(45) Date of Patent: Jun. 30, 2020

(54) METHODS AND SYSTEMS FOR A NATURAL AND REALISTIC TELEPRESENCE EXPERIENCE

(71) Applicant: Noah Zimmerman, Sebastopol, CA (US)

(72) Inventor: Noah Zimmerman, Sebastopol, CA (US)

( * ) Notice: Subject to any disclaimer, the term of this patent is extended or adjusted under 35 U.S.C. 154(b) by 5 days.

(21) Appl. No.: 16/046,628

(22) Filed: Jul. 26, 2018

(65) Prior Publication Data

US 2019/0037170 A1    Jan. 31, 2019

Related U.S. Application Data

(60) Provisional application No. 62/539,350, filed on Jul. 31, 2017.

(51) Int. Cl.
| | |
|---|---|
| *H04N 7/14* | (2006.01) |
| *H04N 5/247* | (2006.01) |
| *H04N 5/235* | (2006.01) |
| *H04N 5/232* | (2006.01) |

(52) U.S. Cl.
CPC ............ *H04N 7/144* (2013.01); *H04N 5/232* (2013.01); *H04N 5/2353* (2013.01); *H04N 5/2354* (2013.01); *H04N 5/2357* (2013.01); *H04N 5/247* (2013.01); *H04N 7/147* (2013.01)

(58) Field of Classification Search
CPC .... H04N 5/232; H04N 5/2353; H04N 5/2354; H04N 5/2357; H04N 5/247; H04N 7/144; H04N 7/147

USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270
See application file for complete search history.

(56) References Cited

U.S. PATENT DOCUMENTS

| | | | | |
|---|---|---|---|---|
| 6,141,034 | A | * | 10/2000 | McCutchen ........... G02B 27/22 348/36 |
| 9,219,878 | B2 | * | 12/2015 | Robinson .................. H04N 7/15 |
| 2014/0267835 | A1 | * | 9/2014 | Samadani .............. H04N 7/144 348/241 |
| 2014/0317561 | A1 | * | 10/2014 | Robinson .................. H04N 7/15 715/800 |

(Continued)

Primary Examiner — Khai N. Nguyen
(74) Attorney, Agent, or Firm — Shook, Hardy & Bacon, LLP

(57) ABSTRACT

Embodiments of the present invention are directed towards methods and systems for providing an enhanced telepresence experience to users participating in a videoconferencing session (VCS). In the embodiments a camera is configured and arranged to capture image data covering objects within a substantial portion of the field of view (FOV) of a display device, without capturing image data encoding images displayed on the display device. That is, the camera's FOV is aligned with the display device's FOV. As such, the camera captures image data encoding images in a substantial portion of the display's FOV. Accordingly, users within a VCS may approach their display without falling outside their camera's FOV. This provides an enhanced telepresence experience, where the users may interact with each other through what appears to be a transparent window or barrier.

20 Claims, 12 Drawing Sheets

(56) References Cited

U.S. PATENT DOCUMENTS

2016/0062121 A1* 3/2016 Border .............. G02B 27/0172
                                                    359/630
2016/0337570 A1* 11/2016 Tan ........................ G06F 3/14
2019/0020850 A1* 1/2019 Meyers ................. H04N 5/772
2019/0025590 A1* 1/2019 Haddick .............. G02B 27/141
2019/0037170 A1* 1/2019 Zimmerman .......... H04N 5/232

* cited by examiner (Enhanced System)

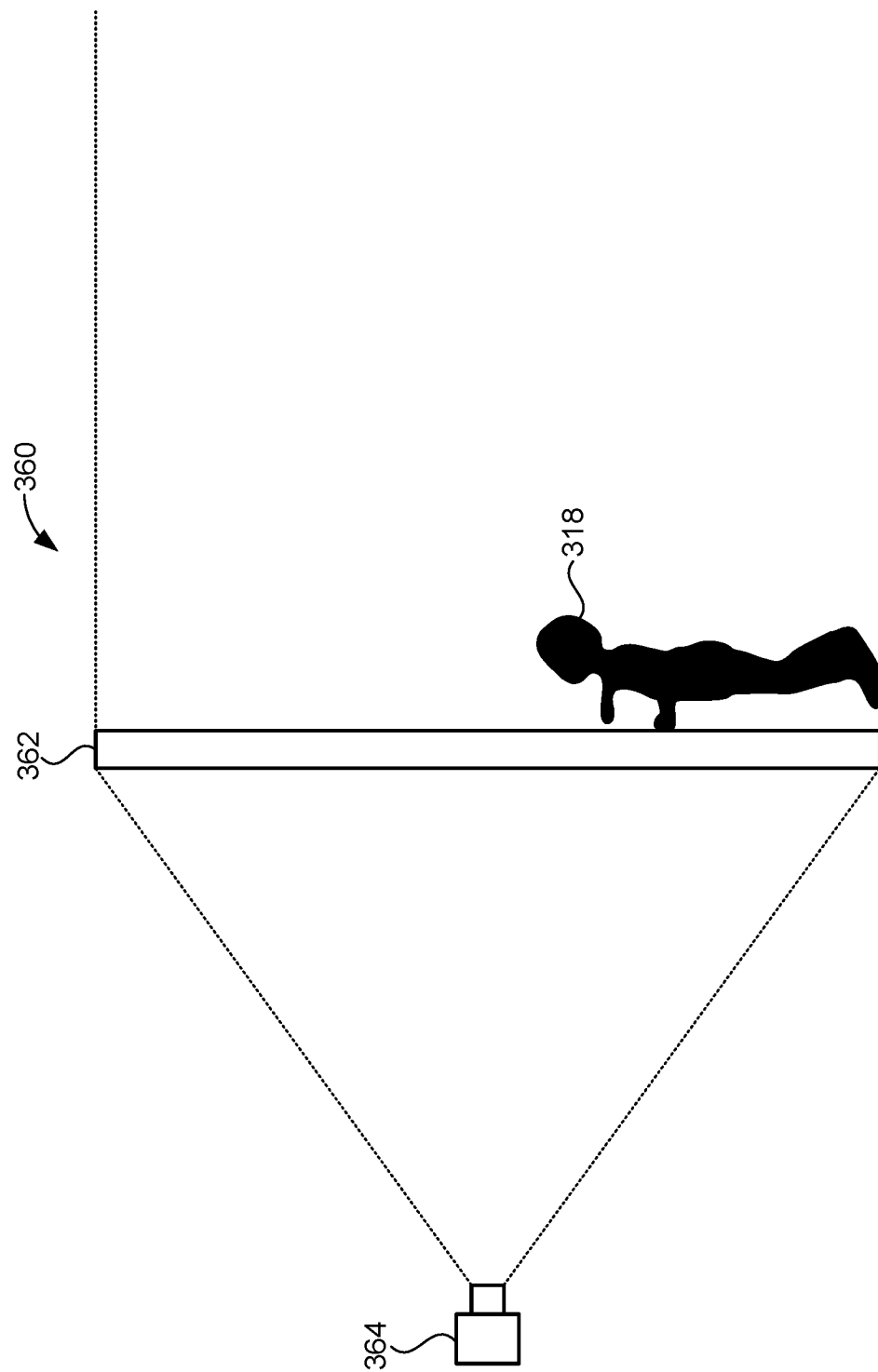

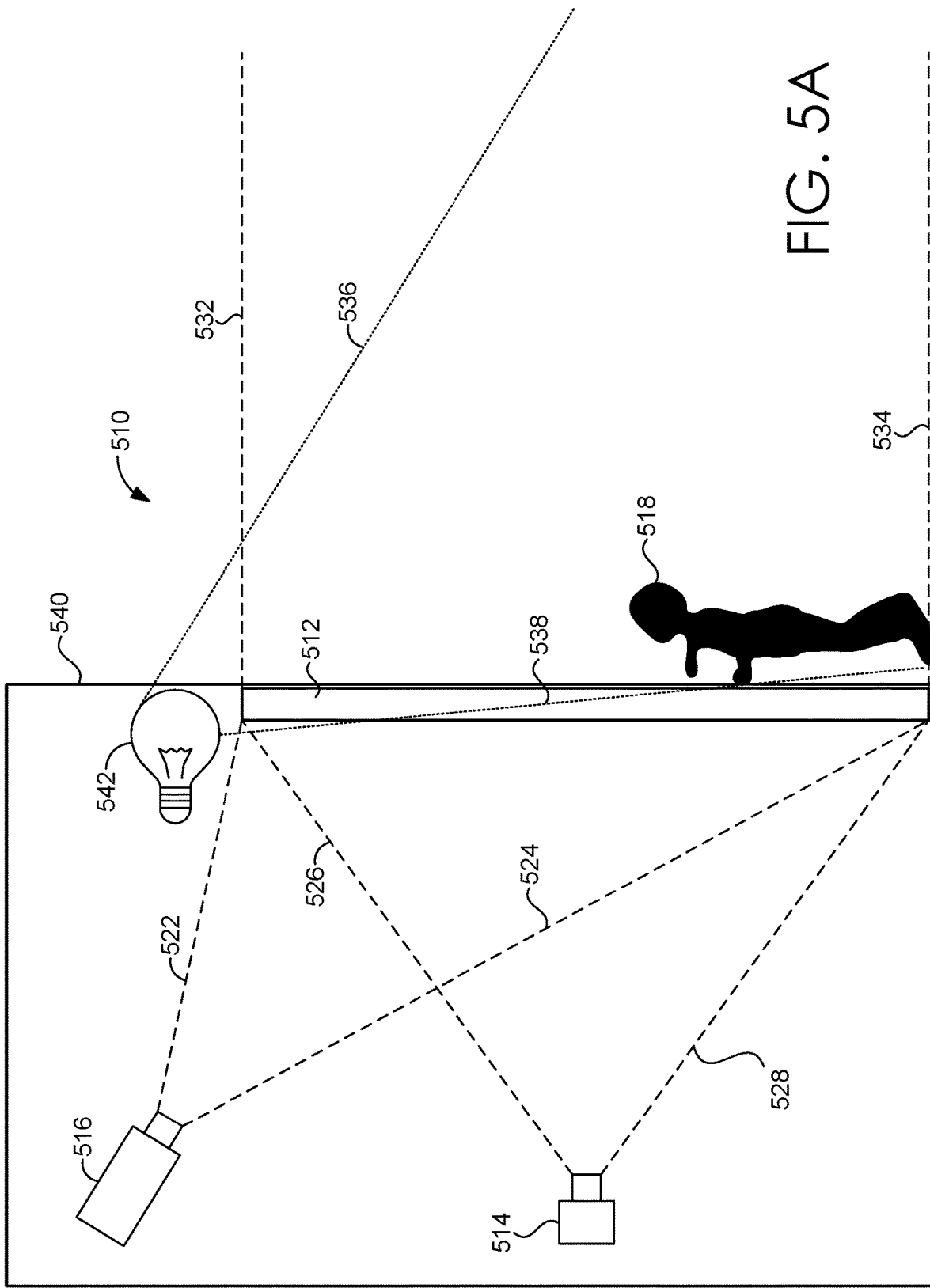

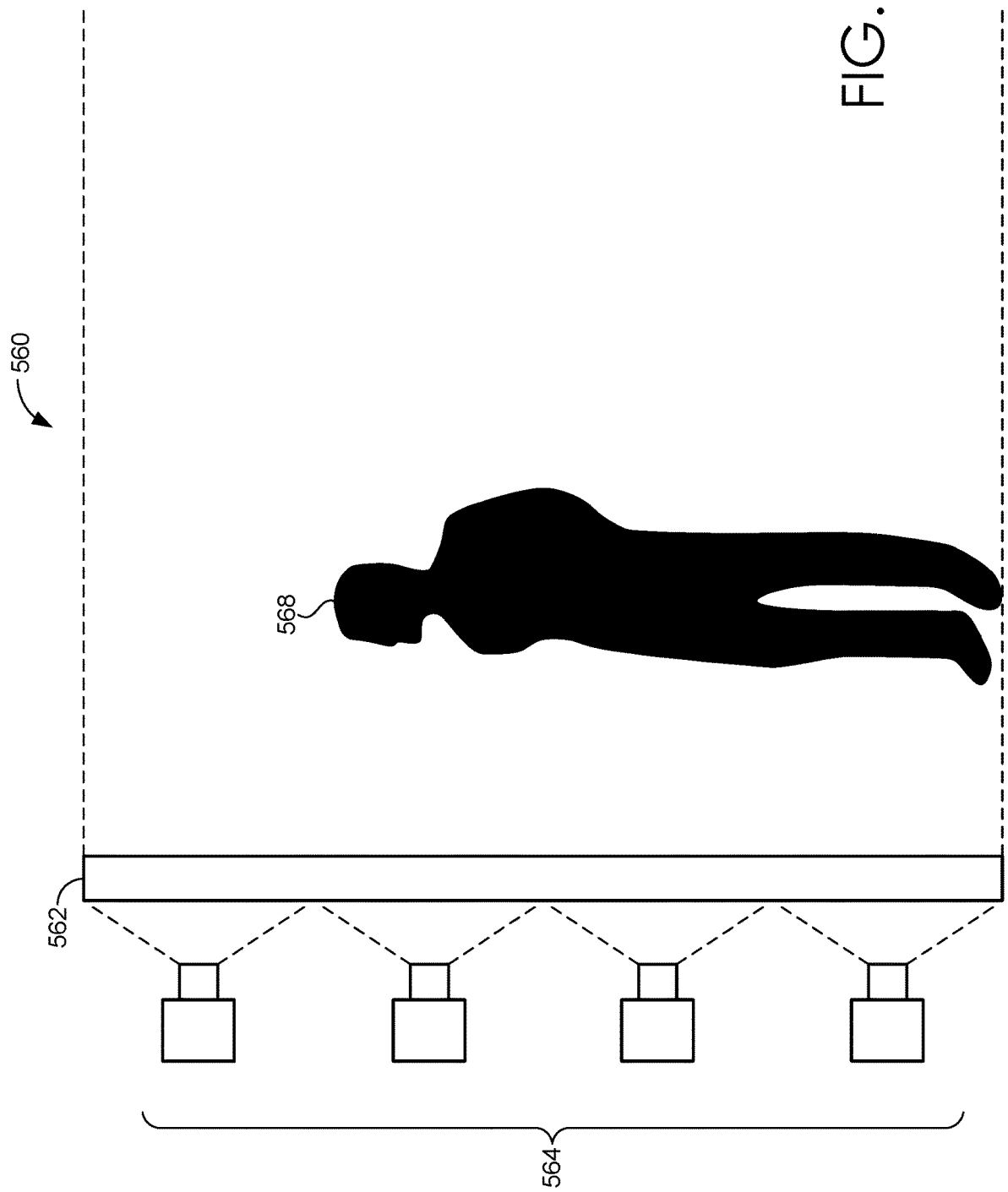

METHODS AND SYSTEMS FOR A NATURAL AND REALISTIC TELEPRESENCE EXPERIENCE

CROSS REFERENCE TO RELATED APPLICATIONS

The application claims priority to U.S. Provisional Patent Application No. 62/539,350, filed on Jul. 31, 2017, entitled METHODS AND SYSTEMS FOR A NATURAL AND REALISTIC TELEPRESENCE EXPERIENCE, the entirety of the contents herein incorporated.

BACKGROUND

The proliferation of networked computing devices equipped with cameras has enabled users to frequently participate in real-time video-enabled teleconferencing sessions, such as conventional videoconferencing sessions (VCSs). Some devices (e.g., conventional mobile devices, desktops, and laptops) include a front-facing camera (FFC) (i.e., a "selfie" camera) that is configured to, as a user views a display of the device, capture image data of the user. Other conventional computing devices may employ a standalone auxiliary camera, such as a web-enabled camera (i.e., a webcam), that is communicatively coupled to the computing device and faces the user. Such conventional FFCs and webcams enable users participating in a VCS to view one another, while remotely communicating in real-time. For example, users may each employ a large camera-equipped display screen to remotely conduct a business meeting. The display employed in such a conventional arrangement may be an interactive screen enabled to simultaneously display shared multi-media content and video of the participants. The screen may take up a significant portion of an office wall and be sized to provide video that at least approximates the real-world physical dimensions of the users and objects in their environment.

Such conventional VCSs have proven very useful in facilitating business meetings across distances, as well as personal communications between peoples. However, such conventional VCSs are limited in providing the realistic experience of face-to-face communications between the users. That is, a VCS employing conventional cameras and displays may fail to provide the users with a natural telepresence experience that at least simulates a realistic face-to-face interaction between the users.

For example, although both the camera and display may be facing in the same direction, regions near the display may be outside of the camera's field of view (FOV). As such, when a user is outside their camera's FOV (e.g. the user is too close to the display), the camera will not capture image data depicting the user. This is often experienced when a user employs their hand and/or fingers to point to content rendered on the display, walks too close to the display, and the like. For these and other reasons, conventional VCSs often lack a realistic and natural telepresence experience for the users.

SUMMARY

Embodiments of the present invention are directed towards methods and systems for providing an enhanced telepresence experience to users participating in a videoconferencing session (VCS). In the embodiments a camera is configured and arranged to capture image data covering objects within a substantial portion of the field of view (FOV) of a display device, without capturing image data encoding images displayed on the display device. That is, the camera's FOV is aligned with the display device's FOV. As such, the camera captures image data encoding images in a substantial portion of the display's FOV. According, users within a VCS may approach their display without falling outside their camera's FOV. This provides an enhanced telepresence experience, where the users may interact with each other through what appears to be a transparent window or barrier.

BRIEF DESCRIPTION OF THE DRAWINGS

FIG. 3B schematically illustrates another embodiment of an enhanced videoconferencing apparatus that may be employed in the system of FIG. 3A.

FIG. 5A shows a schematic view of projection-based enhanced videoconferencing apparatus that is consistent with the various embodiments.

FIG. 5B schematically illustrates another embodiment of an enhanced videoconferencing apparatus that is consistent with the various embodiments herein.

DETAILED DESCRIPTION

Figure 1A:
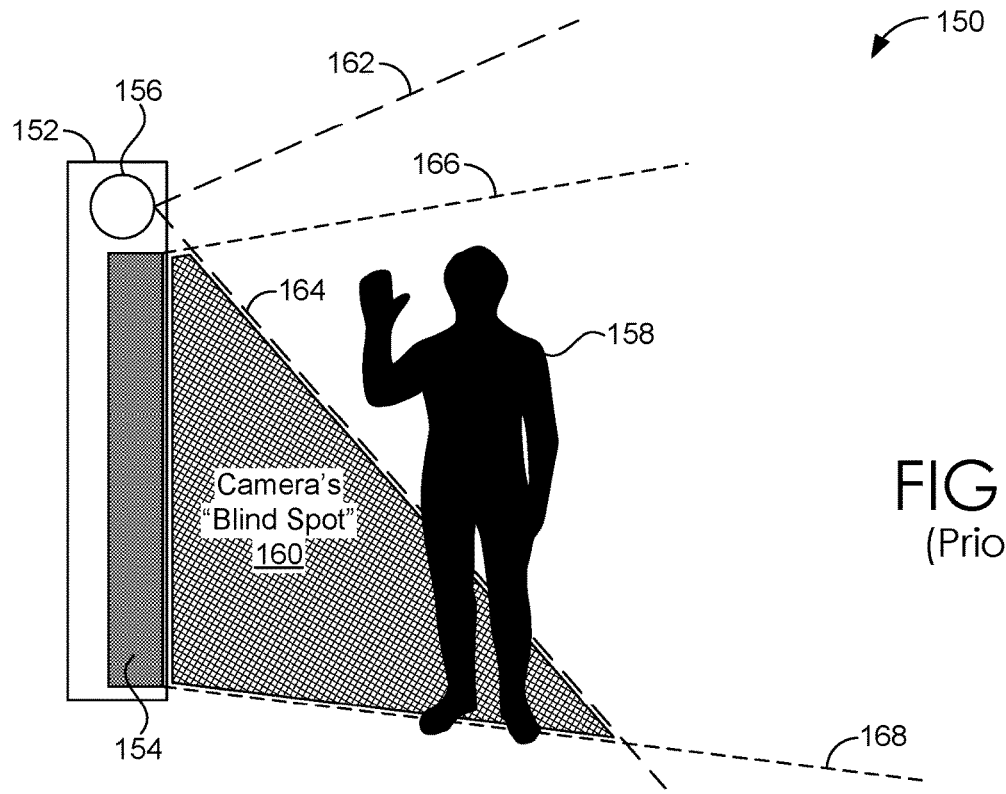
FIG. 1A schematically illustrates a conventional videoconference system that a user may employ to participate in a conventional video conferencing session.

Briefly stated, various embodiments are directed towards enhanced systems and methods for providing users with a realistic and natural telepresence experience. As used herein, the term "telepresence experience" refers to a user's experience when participating in a video-enable communication session, i.e., the user's experience associated with a video conference session (VCS). In the various embodiments, enhanced arrangements of networked displays and cameras are configured to enable a VCS. In an enhanced arrangement of a display and corresponding camera, a field of view (FOV) of the camera is at least approximately aligned with the FOV of the display such that the camera's FOV is at least approximately equivalent or similar to the display's FOV. The camera is further configured to not capture image data encoding images displayed on the corresponding display. By configuring the camera's FOV to at least approximate the display's FOV, without capturing images of the display, various enhancements are provided over conventional arrangements of cameras and displays that do not include the alignment of the camera's FOV and the display's FOV. In various embodiments, the camera's FOV captures at least a substantial portion of the display's FOV, such that the camera is not associated with blind spots in front of the display device.

As used herein, the term "camera" refers to any device that senses or detects electromagnetic (EM) radiation and, in response to the detected EM radiation, generates image data encoding an image based on the detected EM radiation. In various embodiments, a camera is a digital camera that includes a two-dimensional (2D) array of EM radiation (or photon) sensors (or detectors), such as but not limited charge-coupled devices (CCDs). Each discreet sensor of a camera may correspond to one or more "pixels" of the image data. As such, an image may be encoded in digital image data that includes a 2D array of pixels, where each pixel encodes one or more signals corresponding to the detected EM radiation. The discrete sensors of a camera may be referred to as "the camera's pixels," or equivalently, "the pixels of the camera." Thus, depending upon the content, the term "pixel" may refer to a EM radiation sensor of a camera or a discrete unit of information or data encoding an image, i.e. the data generated by a photon detector.

As used herein, the terms "display device" and "display" are used interchangeably to refer to any device, component, or apparatus that is enabled to display image data. A display device may be a display that displays an image by actively generating light corresponding to the image data encoding the displayed image. A display may include a monitor for a computing device, a television display, a touch-sensitive screen, or the like. A display may include, but is not otherwise limited to, a cathode ray tube (CRT) display, a liquid crystal display (LCD), a light emitting diode (LED) display, an organic LED (OLED) display, a plasma display, or the like. Such active display devices may be included in a computing device, such as but not limited to a mobile device, desktop, or laptop computing device. In other embodiments, a display may include a combination of a projector and surface, such as but not limited to a screen, i.e. a projection system. In such projection embodiments, a projector is employed to project an image onto a screen. In any of the various projection embodiments, various rear projection techniques may be employed. That is, the projection and projection screen may be adapted for rear projection techniques. The projection screen may be at least partially transparent, so that a camera positioned behind the projection screen may capture images of objects on the front side of the projection screen. In some embodiments, the camera may be embedded in the display. Various coatings, such as but not limited to anti-reflection coatings may be applied to one or both sides of the projection screen to minimize any "ghosting effects," i.e., a tendency of the camera to generate image data encoding images projected on the projection screen.

A display may include a 2D array of discreet regions, referred to as pixels, that each displays a discreet unit of image data, i.e. a pixel of image data. For example, an LCD display may include a 2D array of display pixels that each displays one or more pixels of image data. The terms "camera pixel," "data pixel," and "display pixel," may be employed to differentiate the context of the term pixel. Thus, a camera may include a 2D array of camera pixels that generates a 2D array of image data pixels, which encode an image captured by the camera. The display may display the captured image by employing each display pixel of the display to display one or more of the image data pixels of the image data. In projection embodiments, the physical region of the screen that reflects, or otherwise transmits, the portion of the image that corresponds to a discreet image data pixel may be referred to as a display pixel.

The terms "the camera's FOV," or "the FOV of the camera" are used interchangeably to indicate the region of space that is optically observed or sensed via the camera. In some embodiments, the camera's FOV indicates one or more regions of the camera's environment from which electromagnetic radiation, traversing thru the region and directed towards the camera, will be detected via the camera. In various embodiments, each camera pixel of a camera has a FOV, thus a camera pixel's FOV may refer to the region of space that is optically observed or sensed via the camera pixel. A camera's FOV may be equivalent to the union of the FOV for each of the camera pixels of the camera.

The terms "the display's FOV" or "the FOV of the display" are used interchangeably to indicate the region of space from which an image displayed by the display is optically observable via an eye or another camera. In some embodiments, the display's FOV indicates one or more regions of the display's environment from which electromagnetic radiation corresponding to the displayed image and generated and/or transmitted by the display, can be detected via an observer. In various embodiments, each display pixel of a display has a FOV, thus a display pixel's FOV may refer to the region of space that the display pixel transmits EM radiation to. A display's FOV may be equivalent to the union of the FOV for each of the camera pixels of the camera. In various embodiments, a camera's FOV, as well as a display's FOV may be indicated or characterized as an angle or a solid angle.

As indicated above, the various embodiments include enabling a VCS by aligning the FOV of a camera with the FOV of a corresponding display, such that the camera's FOV is at least approximately equivalent or similar to the display's FOV. When the camera's and display's FOVs are co-aligned, the FOV of the most of the display pixels of the display are co-aligned with one or more camera pixels of the camera. That is, the optical line of sight (LOS) of each display pixel is equivalent or at least similar to the optical LOS of one or more camera pixels. Such a co-alignment of pixels may characterize a mapping or correspondence between the display pixels and the camera pixels, wherein the mapping generates a correspondence between camera and display pixels with equivalent or similar FOV's.

FIG. 1A schematically illustrates a conventional video conference system 150 that a user 158 may employ to participate in a conventional VCS. Conventional system 150 includes a conventional computing device 152 that enables a conventional VCS. Conventional computing device 152 is shown from a side profile view in FIG. 1A and includes a display device 154 and a front-facing camera (FFC) 156. For example, computing device 152 may be a wall mounted or free standing video conferencing system. The FOV of FFC 156 includes the region of space between the hashed line segments 162 and 164. The FOV of display 154 includes the region of space between the dotted line segments 166 and 168. Note that the FOV of camera 156 is not aligned with the FOV of the display 154. As such and as schematically shown in FIG. 1A, in conventional system 150, regions exist within the FOV of display 154 that are outside the FOV of camera 156. For example, the hashed region labeled camera's "blind spot" are outside the FOV of camera 156 but within the FOV of display 154. As used herein, the term "a camera's blind spot" refer to regions within a corresponding display's FOV but outside the camera's FOV. As shown in FIG. 1A, when portions of the user's 158 body are within the camera's blind spot, those portions of the user's body will not be imaged via FFC 156.

Figure 1B:
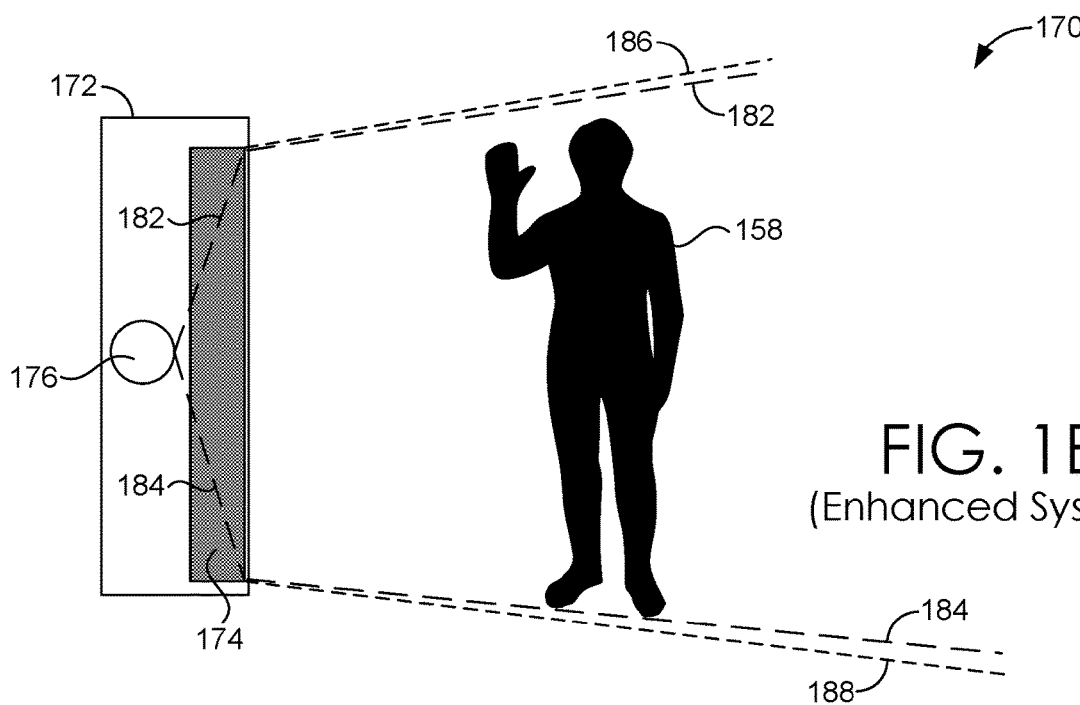
FIG. 1B schematically illustrates an enhanced videoconference system that a user may employ to participate in an enhanced video conferencing session that is consistent with the various embodiments herein.

FIG. 1B schematically illustrates an enhanced videoconference system 170 that a user 158 may employ to participate in an enhanced VCS. Enhanced system 170 includes an enhanced computing device 172 that enables an enhanced VCS. Enhanced computing device 152 is shown from a side profile view in FIG. 1B and includes a display device 174 and a front-facing camera (FFC) 176 (or simply camera 176).

Similar to conventional computing device 152 of FIG. 1A, enhanced computing device 172 may be a wall mounted or free standing video conferencing system. In other embodiments, enhanced computing device 172 may be a desktop computing device, laptop computing device, mobile computing device (e.g., a smartphone or tablet), a wearable computing device, or any other type of computing device. In FIG. 1B, only display device 174 and FFC 176 are depicted. However, note that enhanced computing device may include other components typically included in a computing device, such as but not limited to a network component. Note that the physical dimensions of FIG. 1B may not be to scale. For example, in the embodiments where enhanced computing device 172 is a smartphone, the physical dimensions of enhanced computing device 172, compared to user 158, would be significantly smaller than those illustrated in FIG. 1B. Additionally the ratio of the width to the height of enhanced computing device 172, as shown in FIG. 1B may be exaggerated, e.g., tablet embodiments. As with other figures herein, FIG. 1B is intended as a schematic representation.

The FOV of FFC 176 includes the region of space between the hashed line segments 182 and 184. The FOV of display 174 includes the region of space between the dotted line segments 186 and 188. In contrast to conventional system 150, the FOV of camera 176 is aligned with the FOV of the display 174. As such and as schematically shown in FIG. 1B, in enhanced system 170, when the camera's FOV is aligned with the display's FOV, the camera's blind spots are drastically reduced. That is, the amount of space that is within the display's FOV but outside the display's FOV is greatly reduced. As such, as the user 158 approaches display 174, FFC 176 will continue to image the whole of the user's 158 body.

Display device 174, as well as any of the display devices discussed in conjunction with FIGS. 1B-9, may be at least partially optically transparent display devices. That is, display device 174 may allow at least partial passage of light from user's 158 side of display device 174 to reach camera 176. As such, camera 176 is enabled to generate image data depicting user 158. Furthermore, as discussed throughout, the FOV of camera 176 is aligned with the FOV of display device 174, camera 176 is enabled to generate image data depicting at least a substantial amount of the FOV of the display. Also, camera 176, as well as any of the cameras discussed in conjunction with FIGS. 1B-9, are configured to not generate image data corresponding to images displayed on the display devices. In some embodiments, the at least partial transparency of the display devices may be biased in the direction of light passing from the user to the camera. Various optical films, such as anti-reflective and/or polarizing films may be included in any of the display devices to enhance the camera's capability of not generating images displayed on the display device.

Thus, and in contrast to conventional system 150, when two users are each employing enhanced systems that include at least partial alignment between a user's display and their camera, the user may participate in an enhanced VCS, where the users' experience is that of almost looking at each other through a "transparent barrier," such as a window. For example, and similar to a "real world window," as a user approaches the display, the other user may be provided a visual experience of the user walking towards them. In contrast, as shown in FIG. 1A, in conventional VCS systems, as a user approaches their display, they will enter their camera's blind spot. That is, enhanced system 170 provides a more realistic telepresence experience for the users.

In the various embodiments, it is contemplated multiple enhanced video conference systems, such as but not limited to enhanced system 170, may be remotely positioned, so that remote users may be provided an enhanced telepresence experience. In addition to business meetings and personal communications, such embodiments may be deployed for entertainment and artistic purposes. For a non-limiting example, two art shows may be simultaneously occurring, one in New York and one in Los Angeles. A first enhanced system may be installed at the New York art show, while a second enhanced system may be installed at the Los Angeles art show. Remote performance artists, or other participants of the remote art shows, may interact in novel and interesting ways via a VCS enabled by the two enhanced systems. Similarly, spectators at remote, but simultaneously occurring sporting events, may participate in entertaining and realistic interactions. Such enhanced video conference systems may be installed in various public spaces, such as but not limited to public parks, airports, train stations, shopping complexes, restaurants, taverns, pubs, coffee shops, or other meeting places. Such embodiments may provide fun, entertaining, and amusing one-off anonymized and random interactions between users navigating through remote public spaces. The embodiments may also be employed in networked video gaming applications. That is, users may participate in networked video games, and interact with each in the video game via the embodiments. At least a portion of the video game environment, as well as the players (or their virtual avatars) may be displayed on the displays, and the other players may interact with displayed player/avatar via the enhanced telepresence. The embodiments also provide the capability to capture full-body video data of a user in front on the display/camera system. That is, full-body video data may be captured of the user, as the user approaches the front of the display. As a user approaches a conventional camera, with a limited FOV, at least portions of the user's body may fall outside of the camera's FOV. Thus, the embodiments may be applied to capture and archive full-body video data of a user directly in front of a display device. Unless stated to the contrary, the physical dimensions depicted in the figures presented herein need not be to scale. That is, the figures are intended as schematic representation that illustrate various embodiments. For example, as noted above, in FIG. 1C, enhanced computing device 172 may be a tablet, and thus significantly smaller than user 158. In other embodiments, the relative sizing of enhanced computing device 172 and user 158 may be approximated in FIG. 1C.

An Exemplary Enhanced Videoconference System

Figure 1C:
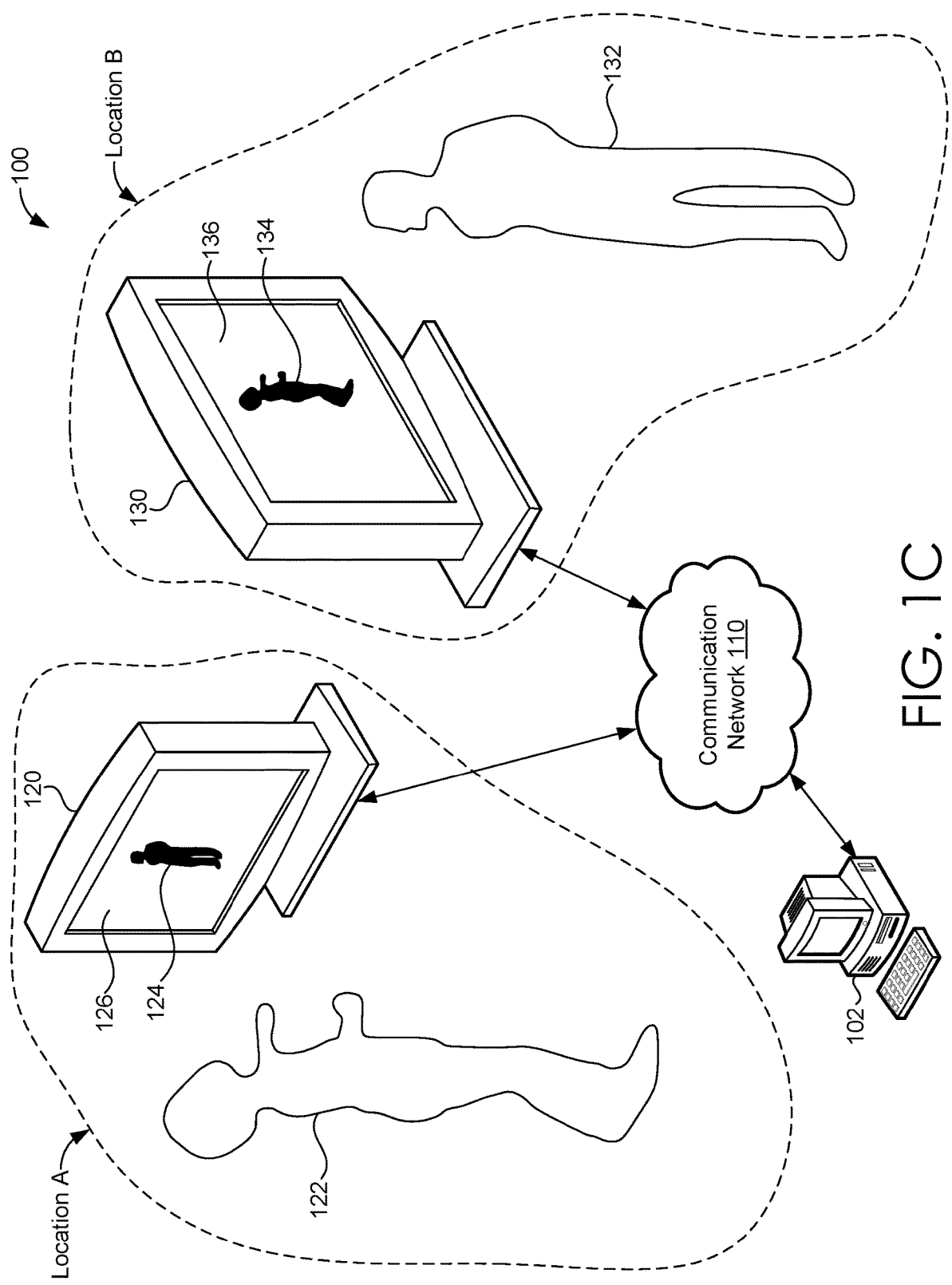
FIG. 1C illustrates an exemplary embodiment of an enhanced videoconference system that is enabled to provide users with a realistic and natural telepresence experience that is consistent with the various embodiments discussed herein.

FIG. 1C illustrates an exemplary embodiment of an enhanced videoconference system 100 that is enabled to provide users with a realistic and natural telepresence experience that is consistent with the various embodiments discussed herein. System 100 is a distributed enhanced videoconference system. System 100 includes a first enhanced videoconferencing apparatus (VCA) 120, located at location A, and a second enhanced VCA 130, located at location B. The first VCA 120 and the second VCA 130 are communicatively coupled via communication network 110.

First VCA 120 includes at least a first display device 126, a first camera, and a first network component. Similarly, second VCA 130 includes at least a second display device 136, a second camera, and a second network component. For simplicity, the first/second cameras, as well as the first/second network components are not shown in FIG. 1C. The first and second network components enable transmission of data, including at least image data, via communication network 110.

In FIG. 1C, the first user 122 and second user 132 employ first VCA 120 and second VCA 130, respectively, to participate in a real-time, or near real-time, enhanced videoconferencing session (VCS). Location A and location B may be remote from one another at least because of the communicatively coupling of the first VCA 120 and the second VCA 130, via communication network 110. Thus, the first user 122 may be remote from the second user 132. Although only two users (the first user 122 and the second user 132) are shown in in FIG. 1C, it should be understood that more than two users may participate in the enhanced VCS via the communicatively coupling of additional VCAs via the communication network 110.

Various embodiments of an enhanced VCA, such as but not limited to first VCA 120 and second VCA 130 are discussed at least in conjunction FIG. 2-9. However, briefly here, each of first and second VCAs 120/130 may be at least somewhat similar to enhanced computing device 170 of FIG. 1B. For example, with regard to first VCA 120, the FOV of the first camera is aligned with the FOV of the first display device 126, similar to the co-alignment of camera 176 and display 174 of FIG. 1B. Likewise, with regard to second VCA 130, the FOV of the second camera is aligned with the FOV of the second display device 136 similar to the co-alignment of camera 176 and display 174. As discussed in the conjunction with at FIG. 1B, co-alignment of the respective FOV of a display and a camera provide enhanced telepresence for users 122 and 132.

As shown in FIG. 1C, the first camera of the first VCA 120 generates video data encoding images of the first user 122. The video data encoding images of the first user 122 is transmitted, via communication network 110, to the second VCA 130. The video data of the first user 122 is displayed via the second display device of the second VCA 130, as illustrated as image 134. Similarly, the second camera of the second VCA 130 generates video data encoding images of the second user 132. The video data encoding images of the second user 132 is transmitted, via communication network 110, to the first VCA 120. The video data of the second user 132 is displayed via the first display device of the first VCA 120, as illustrated as image 124. First VCA 120 and second VCA 130 may transmit and receive image data to/from communication network 110 via network components included in VCAs 120/130.

Accordingly, video data captured and/or generated by the first camera is what is viewable by the second user 132 and video data captured and/or generated by the second camera is what is viewable by the first user 122. When a user is participating in a VCA, the first user 122 "experiences" the "telepresence" of the second user 132 via the video data captured and/or generated via the second camera (the second video data) of the second VCA 130 and the corresponding display of this second video displayed via the first display device of the first VCA 120. Likewise, the second user 132 experiences the telepresence of the first user 122 via the video data captured and/or generated via the first camera (the first video data) of the first VCA 120 and the corresponding display of this first video displayed via the second display device of the second VCA 130.

Because of the mutual alignment of the FOV of the first camera and the FOV of first display 126, the first user 122 may approach first display 126 without moving into a blind spot of the first camera. Thus, the image 134 rendered on second display 136 will continue to include the whole presence of the first user 122 as the first user 122 approaches the first display 126. Likewise, the second user 124 may approach second display 136 without moving into a blind spot of the second camera. Thus, the image 124 rendered on first display 126 will continue to include the whole presence of the second user 132 as the second user 132 approaches the second display 136.

System 100 may further include one or more computing devices, such as but not limited to computer device 102. Such computing devices may be communicatively coupled to at least one of the VCAs 120 or 130 via communication network 110. An exemplary, but non-limiting embodiment of a computing device is discussed in conjunction with at least computing device 500 of FIG. 5. However briefly, a computing device may be referred to as a processor device because a computing device generally employs and/or includes a processor.

Communication network 110 may be any communication network, including virtually any wired and or wireless communication technologies, wired and/or wireless communication protocols, and the like. It should be understood that communication network 110 may be virtually any communication network that communicatively couples a plurality of computing devices in such a way as to enable users of computing devices to exchange information via the computing devices.

An Exemplary Enhanced Videoconferencing Apparatus

Figure 2:
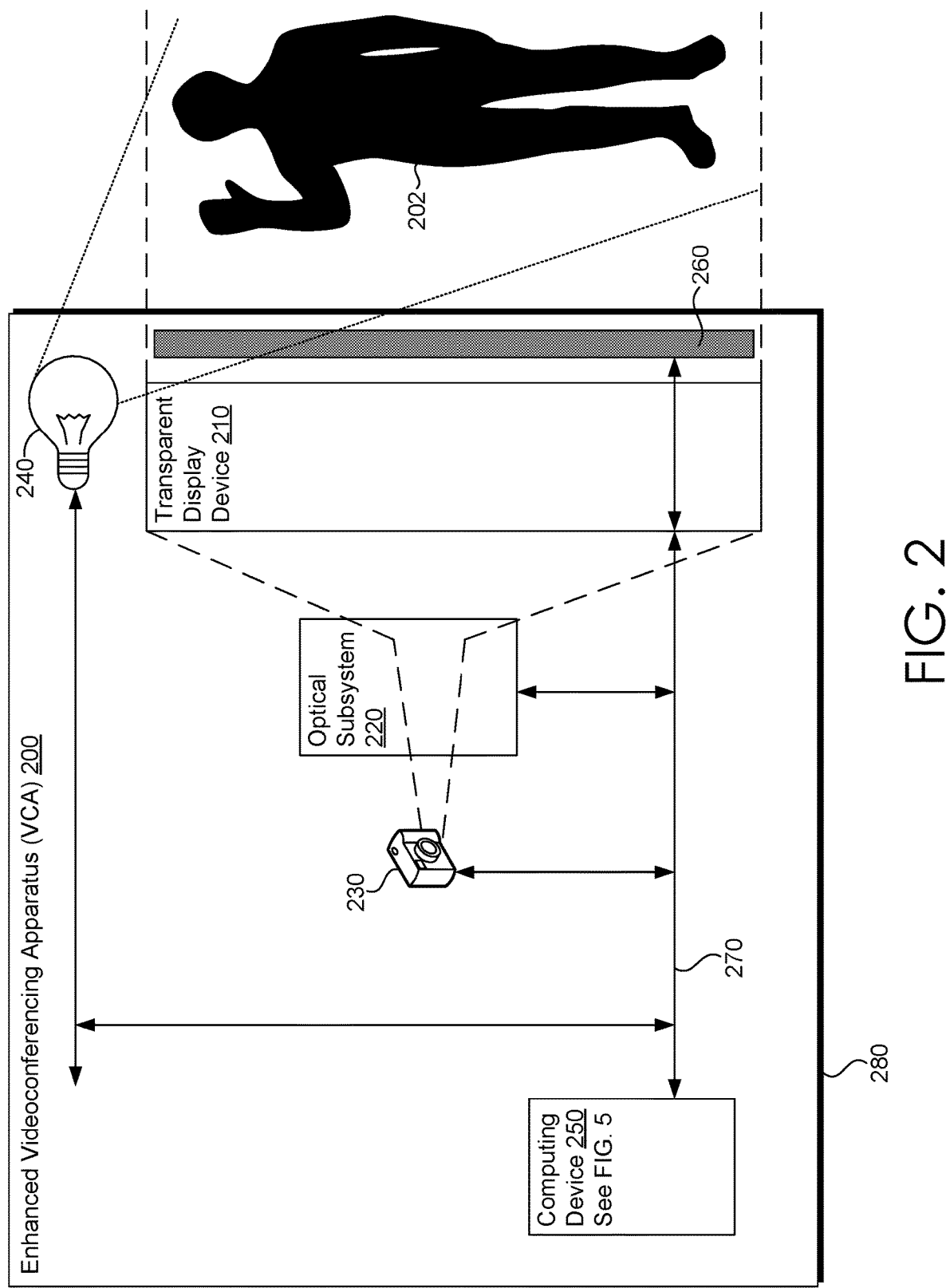
FIG. 2 schematically illustrates an exemplary embodiment of an enhanced videoconferencing apparatus that may be employed in the system of FIGS. 1B-1C.

FIG. 2 schematically illustrates an exemplary embodiment of an enhanced videoconferencing apparatus (VCA) 200 that may be employed in the enhanced systems 170 and 100 of FIGS. 1B-1C. For instance, VCA 200 may be similar to at least one of enhanced computing device 170 of FIG. 1B or first VCA 120 and/or second VCA 130 of FIG. 1C. VCA 200 includes a transparent, or at a least semi-transparent, display device 210. For instance, display device 210 may include transparent, or at least semi-transparent, a two-dimensional arrays of light-emitting display pixels. For instance, the transparent display pixels of display device 210 may be liquid crystal (LCD) pixels, light-emitting diode (LED) display pixels, or the like. Display device 210 may be a transparent organic LED (OLED) display device.

VCA 200 includes a photon-detector, such as camera 230. Because display device 210 is transparent, or at least semi-transparent, camera 230 may capture and/or generate image data (such as video image data) of objects on the opposite side (i.e., the external side) of display device 210, such as user 202. VCA may include one or more light sources 240 that may at least partially illuminate the objects positioned on the external side of display device 210. As shown in FIG. 2 via the hashed lines, camera 230 and display device 210 may include mutually aligned pixels. Optical subsystem 220 may at least partially enable the mutual alignment of the camera pixels of camera 230 and the display pixels of display device 210. Optical subsystem 220 may include various optical elements, such as lenses, mirrors, optical fibers, shutters, apertures, diffraction gratings, and the like to enable attenuating, minimizing (or at least decreasing ghosting effect), and increasing/enhancing the mutual alignment of the camera pixels of camera 230 and the transparent display pixels of display device 210.

Note that in some embodiments, the mutual alignment of the camera pixels of camera 230 and the display pixels of display device 210 may include a mapping or correspondence between the camera pixels and the display pixels. In at least one non-limiting embodiment, the mapping may be a one-to-one mapping. For instance, each camera pixel may be positioned behind (or in front of) the corresponding display pixel. In other embodiments, the mapping may not be a one-to-one mapping. The display pixel may be at least a partially transparent display pixel. The camera pixels may be smaller than the corresponding display pixels, and the optical subsystem 220 enables the "zoom-out" of the camera pixels, such that the "area" or solid angle subtended by a camera pixel is equivalent or similar to the area or solid angle of the corresponding pixel. In at least some embodiments, the camera pixel and the display may be one in the same. That is, a pixel may be enabled to be both photosensitive (i.e., a camera pixel) as well as an emitter of photons (i.e., a display pixel). In some embodiments, the pixel may be transitioned periodically to a display mode and a camera mode. For instance, the mode of such dual-purposes pixel may be modulated at 60 Hz, where the pixels takes 60 frames of image data of the user per second, and alternately display 60 frames of image data to the user.

VCA 200 may include a computing 250. Various embodiments of computing devices are discussed in conjunction with at least computing device 500 of FIG. 5. However, computing device 250 may include a network device to communicatively couple VCA 200 to a communication network, such as communication network 110 of FIG. 1C. Computing device 250 may include one or more processing devices to process and/or buffer at least some of the video data captured by camera 230 or the video data received via the communication network. VCA 200 may include a communication bus 270 to communicatively couple the various components.

The various components of VCA 200 may be housed within a light-tight housing 280, where the only sources of light entering into housing 280 are through the transparent display device 210 or any apertures and/or lenses for projecting light from light source 240. In some embodiments light source 240 may be located outside of housing 280 to minimize light entering into housing 280. Minimizing external light impinging on the pixels of camera 230 may minimize ghosting issues. Herein, ghosting refers to feedback event, where at least due to the transparency of display device 210, the camera 230 may generate video data corresponding to the image displayed via display device 210. Minimizing the external light exposing the photon-detecting pixels of camera 230 may help minimize such ghosting feedback.

Anti-reflective elements, such as anti-reflective film 260, located on the external side of the display device 210 may reduce the reflection and ghosting issues. Additional optical components such as polarized lenses may additionally be placed on the external side of display device to further decrease ghosting issues. The illumination of the user 202 via light source 240 may also reduce ghosting effects. Staggering a shuttering of the camera 230 and the display 210 may further reduce ghosting. For instance, a phase difference of it may be introduced such that camera 230 is acquiring video data only when display device is not displaying and vide versa. A shuttering frequency may be chosen, such that a flickering is not observable via the users.

As shown in FIG. 2, the size of display device 210 may be that on the order of the size of the user 202, or may be smaller, such as a size more consistent with desktop display monitors, or even the display of mobile devices, such as tablets and smartphones. Note that in some embodiments, the elements of VCA may be integrated into a form factor that approximates a flat panel display. For various exemplary, but non-limiting embodiments, the ratio of the physical width to the physical height of VCA 200 may be significantly exaggerated as illustrated in FIG. 2.

Figure 3A:
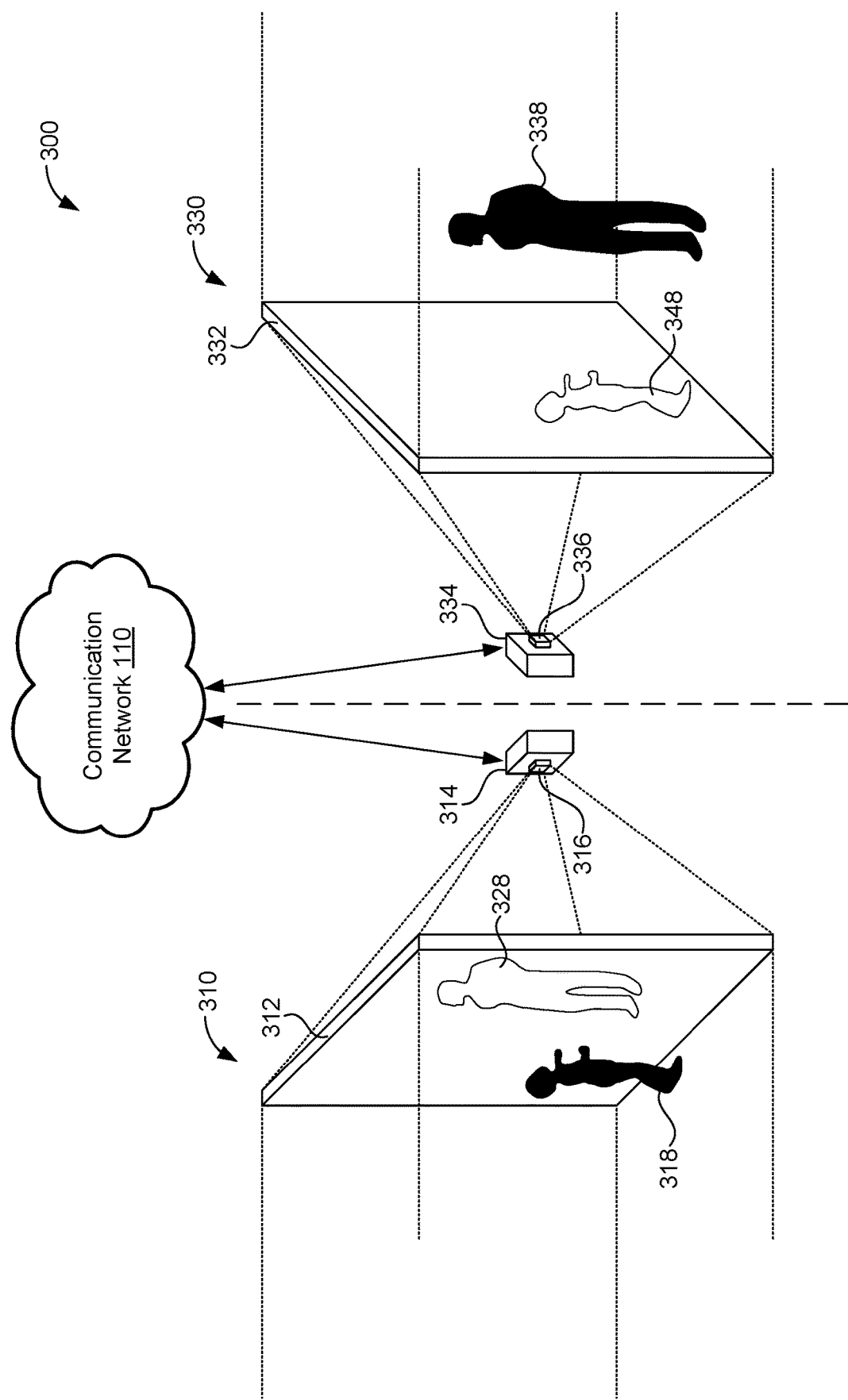
FIG. 3A schematically illustrates a video conferencing session between users that is enabled via an enhanced videoconference system that is consistent with the various embodiments herein.

FIG. 3A schematically illustrates a video conferencing session (VCS) between users that is enabled via an enhanced videoconference system 300 that is consistent with the various embodiments herein. System 300 includes a first enhanced videoconferencing apparatus (VCA) 310 and a second enhanced VCA 330 that are communicatively coupled via communication network 110. A first user 318 employs the first VCA 310 and a second user 338 employs to second VCA 330 to participate in an enhanced VCS. The vertical hashed line indicates that the first user 318 and the second 338 may be positioned in remote locations. As an exemplary non-limiting embodiment, first VCA 310 may be installed at a first art show in New York and second VCA 330 may be installed at a second art show in Los Angeles, where the art shows are occurring simultaneously. First and second users 318/338 may be participants or performers in the respective art shows.

First VCA 310 includes a first projection screen 312 and a first enhanced computing device 314 that is communicatively coupled to communication network 110. First projection screen 312 may be at least a partially transparent screen. In some embodiments, first projection screen 312 may be preferentially transparent in one direction, as opposed to the other direction. First computing device 314 includes a first integrated camera/projector component 316 that includes a first camera and a first image projector. Various optical component included in first integrated camera/projector component 314 may at least partially align the FOV of the first camera with the FOV of the first image projector, as discussed herein.

Likewise, second VCA 330 includes a second projection screen 332 and a second enhanced computing device 334 that is communicatively coupled to communication network 110. Similar to first projection screen 312, second projection screen 332 may be at least a partially transparent screen. In some embodiments, second projection screen 332 may be preferentially transparent in one direction, as opposed to the other direction. Similar to first computing device 314, second computing device 334 includes a second integrated camera/projector component 336 that includes a second camera and a second image projector. Various optical component included in second integrated camera/projector component 334 may at least partially align the FOV of the second camera with the FOV of the second image projector, as discussed herein.

Because first projection screen 312 is at least partially transparent, the first camera of first computing device 314 may capture first image data, including video image data, of the first user 318. Likewise, the second camera of second computing device 334 may capture second image data of the second user 338. Via the communication network, the first image data may be provided to the second computing device 334 and the second image data may be provided to the first computing device 314. The first image projector included in the first integrated camera/projector component 316 may project the second image data onto first projection screen 312. Such a projection results in a display of projected image 328 of the second user 338 on the first projection screen 312. Similarly, the second image projector included in the second integrated camera/projector component 336 may project the first image data onto second projection screen 332. As shown in FIG. 3A, this projection results in a display of projected image 348 of the first user 318 on the second projection screen 332.

As shown in FIG. 3A, and because of the co-alignment of the camera and projector/screen FOVs, first user 318 may approach the first projection screen 312 arbitrarily close, and the entire image 348 of first user 318 is projected onto the second projection screen 332. Similarly, second user 338 may approach the second projection screen 332 without travelling into a blind spot of the second camera included in the second integrated camera/projector component 336.

FIG. 3B schematically illustrates another embodiment of an enhanced videoconferencing apparatus (VCA) 360 that may be employed in system 300 of FIG. 3A. In FIG. 3B, first user 318 is employing VCA 360 to participate in the VCS of FIG. 3A. VCA 360 includes a display device 362. Display device 362 may be similar to display device 210 of FIG. 2, in that display device 362 may be at least partially transparent. The transparent display pixels of display device 362 may be liquid crystal (LCD) pixels, light-emitting diode (LED) display pixels, or the like. Display device 362 may be a transparent organic LED (OLED) display device. VCA 360 also includes an integrated camera 364 that is enabled to capture image data of first user 318.

In some embodiments, camera 364 includes integrated optics that align the FOV of camera 364 with FOV of display device 360. In other embodiments, the optical components may be embedded within display device 262. As with other embodiments herein, because of the co-alignment with camera's 364 FOV and display device's 362 FOV, there are minimal camera blind spots within the FOV of display device 362.

Generalized Processes for an Enhanced Telepresence Experience

Figure 9:
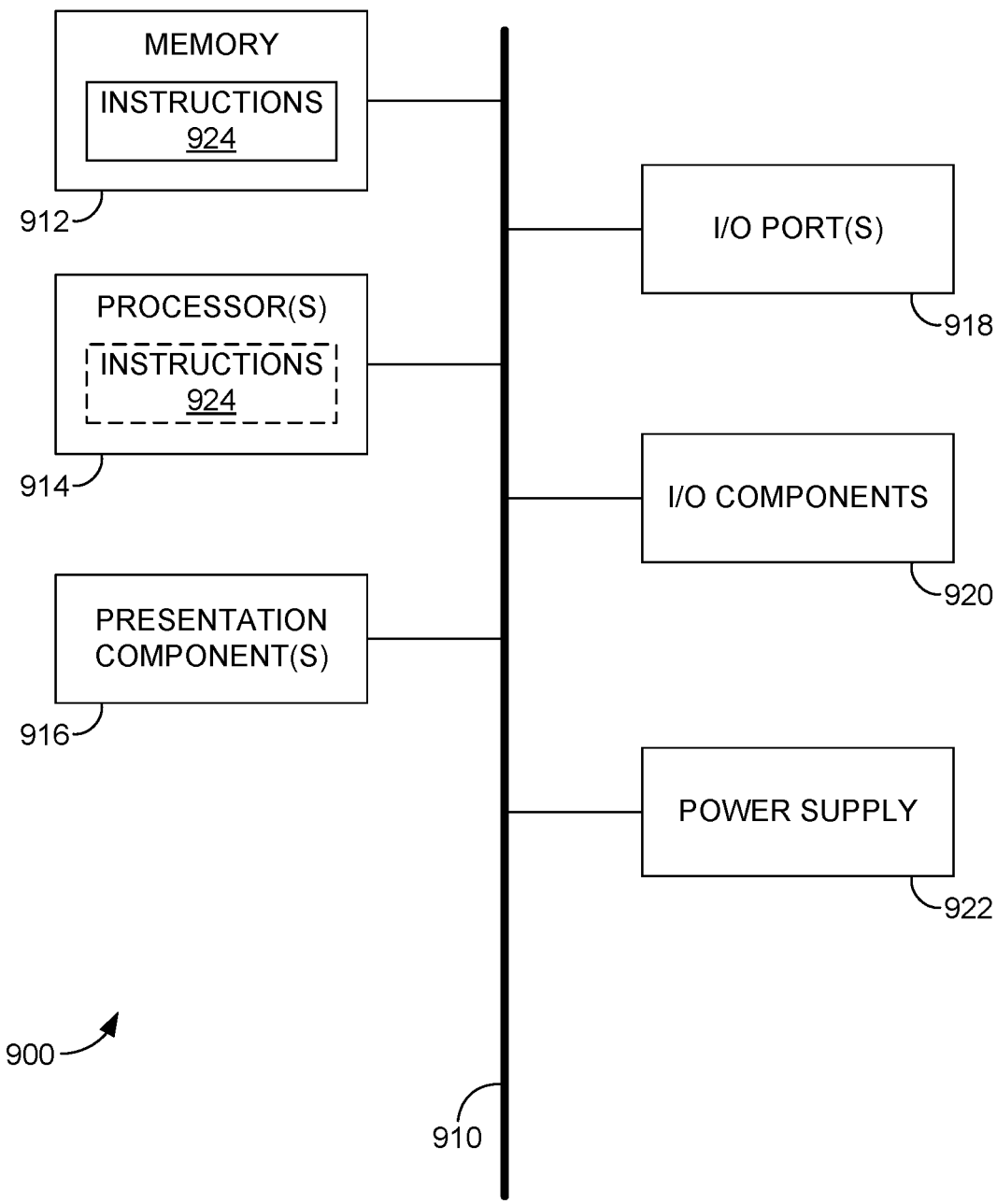
FIG. 9 is a block diagram of an example computing device in which embodiments of the present disclosure may be employed.

Process 400 of FIG. 4 will now be discussed. Briefly, process 400 may be employed to provide enhanced experiences for users participating videoconferencing sessions (VCS). Process 400 is consistent with the various embodiments discussed herein. Process 400 may be implemented, executed, or otherwise performed via a single and/or a combination of the various embodiments discussed herein. For example, system 170 of FIG. 1B, system 100 of FIG. 1C, or system 300 of FIG. 3A may enable such processes. In various embodiments, computing devices, such as but not limited to user-computing device 102 of FIG. 1C, computing device 250 of FIG. 2, or computing device 900 of FIG. 9 are enabled to carry out at least portions of processes 400. In some embodiments, a videoconferencing apparatus (VCA), such as any of those discussed herein and shown in accompanying figures may enable at least portions of processes 400.

Figure 4:
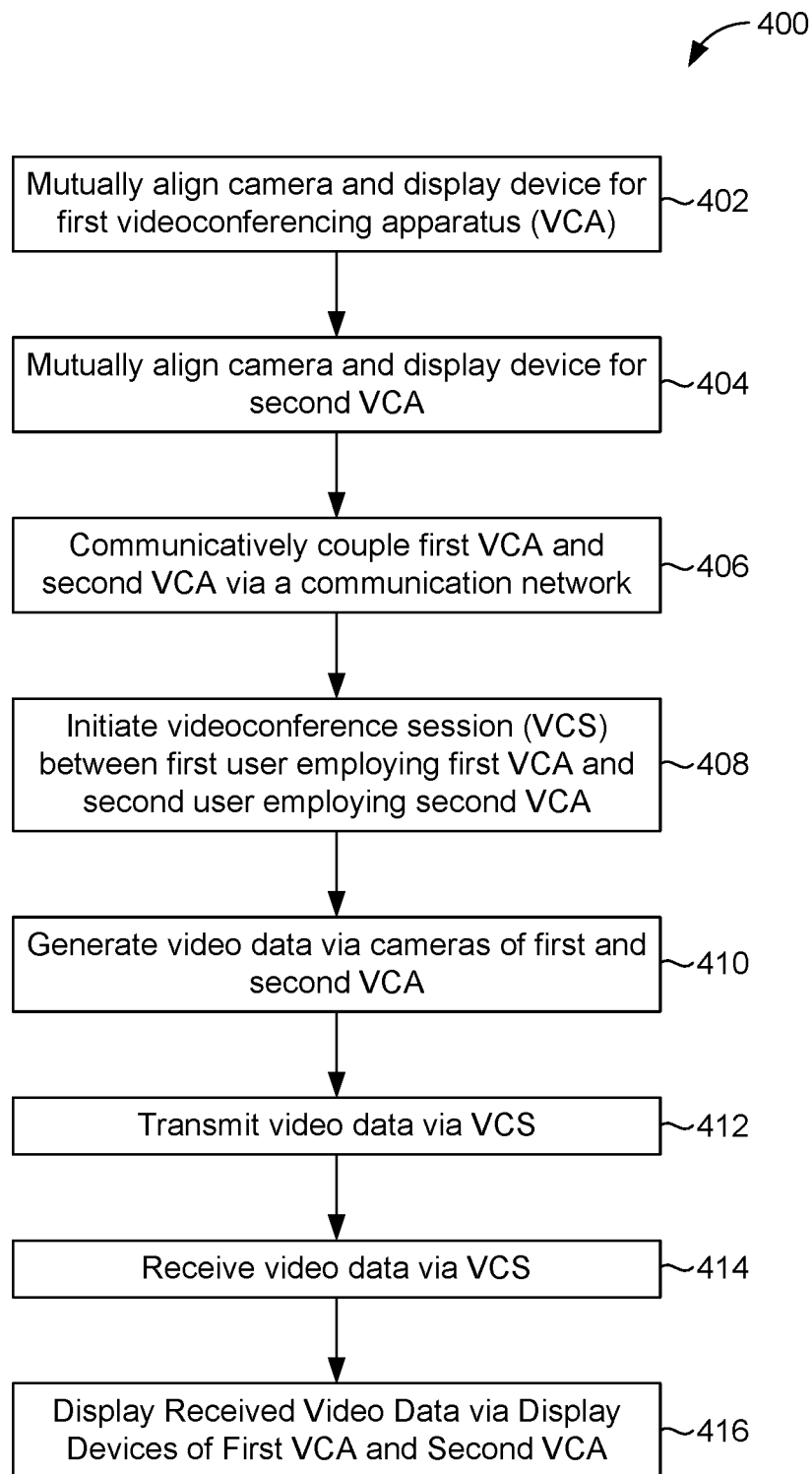
FIG. 4 illustrates one embodiment of a process flow for providing enhanced telepresence experiences that are consistent with the various embodiments presented herein.

FIG. 4 illustrates one embodiment of a process flow for providing enhanced telepresence experiences that are consistent with the various embodiments presented herein. Process 400 begins, after a start block, at block 402 where the FOV of a first camera and the FOV of a first display device of a first VCA are mutually aligned. In at least some embodiments, the FOV of at least a portion of the camera pixels included in the first camera are mutually aligned with the FOV of at least a portion of the display pixels in the first display device. At block 404, the FOV of a second camera and the FOV of a second display device of a second VCA are mutually aligned. At block 406, the first and second VCAs are communicatively coupled via a communication network.

At block 408, a videoconferencing session (VCS) is initiated between a first user employing the first VCA and a second user employing the second VCA via the communicative coupling between the first VCA and the second VCA. At block 410, the first camera may generate and/or capture video image data of the first user. Likewise, the second camera may generate and/or capture video image data of the second user. At block 412, the video data of the first user may be transmitted to the second VCA via the initiated VCS. Similarly, the video data of the second user may be transmitted to the first VCA via the VCS.

At block 414, the video data of the second user may be received at the first VCA and the video data of the first user may be received at the second VCA. At block 416, the first display device may display the video data of the second user. The second display device may display the video data of the first user. Process 400 may terminate and/or return a calling process.

Additional Embodiments for Aligning Field of Views of a Camera and a Display Device FIG. 5A shows a schematic view of projection-based enhanced videoconferencing apparatus (VCA) 510 that is consistent with the various embodiments. User 518 may employ VCA 510 to participate in a video conferencing sessions (VCS), as discussed herein. VCA 510 may include features similar to first and/or second VCAs 310/330 of FIG. 3A. For example, VCA 510 include projection screen 512. Rather than employing an integrated camera/projector component, such as integrated camera projector components 316/338 of FIG. 3A, VCA 510 includes a discreet camera 514 and a discreet projector 516. The projector 522 and the camera may be aligned at least slightly off-axis, as shown in FIG. 5A. On the back side of projection screen 512, the FOV of camera 514 is indicated by hashed lines 526 and 528. On the backside of projection screen 512, the FOV of projector 526 is indicated by hashed lines 522 and 524. On the front side of projection screen 512, the FOV of camera 516 and FOV of projector 516 are at least in partial alignment, as indicated via hashed lines 532 and 534. Thus, similar to other embodiments discussed herein, camera's 514 blind spots in the FOV of screen 512 are reduced and/or minimized. In some embodiments, optical components integrated into camera 514 and/or projector 516 may be employed to increase the mutual alignment of the FOV of camera 514 and the FOV of projector 516. Some embodiments of VCA 510 may include a light source 542 that is configured and arranged to illuminate at least a significant portion of FOV of camera 514 and the co-aligned FOV of screen 512. Additional optical system, not shown in FIG.

5A, may be included to focus the light emitting from light source 542 to particular portions of the FOV of camera 514. The dotted lines 536 and 538 indicate the illumination filed of light source 542. The intensity of light source 542 may be modulated to reduce the propensity of camera 514 capturing images projected onto projection screen 512. Thus, light source 542 may be modulated to reduce any "ghosting" effects for the image data captured via camera 514.

VCA 510, as well as any other projection-based VCA discussed herein, including but not limited to first VCA 310 and second VCA 330 of FIG. 3A may be housed in a light tight, or at least semi-light tight housing, such as housing 540. Housing 540 may house at least camera 514 and projector 516, as well as other components, such as a network communication module. Note that the display surface of screen 512 faces towards users 538. At least a portion of projection screen may be included in housing 540. In some embodiments, light source 542 may be housed within housing 540. In such embodiments, housing may include an aperture to allow passage of the light transmitted from light source 542 to the external environment of housing 540. In other embodiments, light source may be positioned external to housing 540.

FIG. 5B schematically illustrates another embodiment of an enhanced videoconferencing apparatus (VCA) 560 that is consistent with the various embodiments herein. User 568 may employ VCA 560 to participate in a video conferencing sessions (VCS), as discussed herein. VCA 560 includes a display device 562. Display device 562 may be similar to display device 362 of FIG. 3B, in that display device 562 may be at least partially transparent. The transparent display pixels of display device 362 may be liquid crystal (LCD) pixels, light-emitting diode (LED) display pixels, or the like. Display device 362 may be a transparent organic LED (OLED) display device. VCA 560 also includes an integrated array of multiple cameras (i.e., camera array 564) that are enabled to capture image data of first user 568.

In VCA 560, the FOV for each camera included camera array 564 is aligned with a portion of the FOV of display 562. In various embodiments, the union of all the FOVs of the cameras included in camera array 564 is at least approximately aligned with the total FOV of display 562. The cameras of camera array 562 may be operated simultaneously to capture image data of user 568. The image data from all the cameras may be combined to generate an image that includes a FOV that approximates the FOV of display 562. Thus, the total FOV of camera array 562 at least approximates the FOV of display 562. Accordingly, VCA 560 may be employed to provide the enhanced VCS as discussed herein.

Figure 6A:
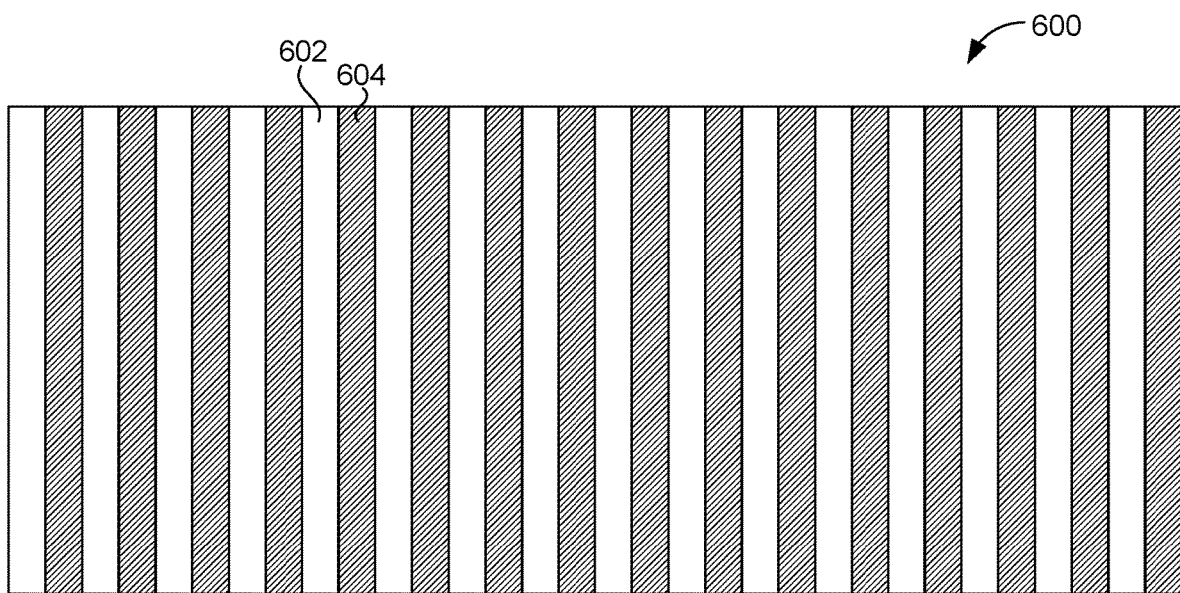
FIG. 6A schematically illustrates an enhanced integrated camera/display device that may be employed in the various embodiments.

FIG. 6A schematically illustrates an enhanced integrated camera/display (ICD) device 600 that may be employed in the various embodiments. ICD device 600 includes both camera pixels and display pixels. In one non limited embodiment, ICD device 600 includes vertical columns of camera pixels, such as but not limited to vertical column 602 of camera pixels, alternating with vertical columns of display pixels, such as but not limited to vertical column 604 of display pixels. The camera pixels may include, but are not limited to charge-coupled device (CCD) pixels, complementary metal-oxide-semiconductor (CMOS) pixels, or the like. The display pixels may include but are not limited to liquid crystal display (LCD) pixels, light emitting diode (LED) pixels, organic LED (OLED) pixels, and the like. In other embodiments not shown in FIG. 6A, an ICD device may include alternating horizontal rows of camera and display pixels.

Thus, ICD device 600 includes a camera comprising the plurality of rows or columns of camera pixels. ICD device 600 also includes a display comprising the plurality of rows or columns of display pixels. Accordingly, in a VCS, such as those discussed herein, via the rows or columns of display pixels of the integrated display, ICD device 600 may display image data received from other devices. ICD device 600 may also capture image data of a user via the rows or columns of camera pixels of the integrate camera. Because of the alternating nature of the rows or columns of camera and display pixels, the FOVs of the integrated display and camera are aligned. Similar to the other embodiments discussed herein, ICD device 600 may be employed to enabled a VCS that does not include camera blind spots in front of the display.

In various embodiments, the density of alternating rows or columns of display and camera pixels is sufficient such that a human eye cannot detect the interleaving of rows or columns of display and camera pixels. That is, a human eye would see a high resolution image displayed via the integrated display, while a high resolution image data of them is captured via the integrated camera. The resolution of the captured image data is sufficient, such that when the high resolution image data is displayed on another display device, a human user cannot detect the "gaps" between the rows or columns of image data.

As noted above, in some embodiments, the display and camera pixels are operated simultaneously. In other embodiments, the display and camera pixels are alternating in time. For example, time may be discretized or bucketed via an operation frequency. In a first instance of discretized time, the display pixels may display a single frame of video image data. In the next instance of discretized time, the camera pixels may capture a single frame of video image data. In the following instance of discretized time, the display pixels are refreshed via the next frame of video image data to be displayed. In a non-limiting example, each of the camera and display pixels may be operated at 100 Hz, such that the display pixels display 100 frames of video image data per second and the camera pixels capture 100 frames of video image data per second. In this non-limiting example, a t=0.000, the display pixels display a first frame of image data. At t=0.005, the camera pixels capture a second frame of image data and at t=0.010, the display pixels display a third frame of image data. In such embodiments, the operating frequencies of the display and camera pixels are chosen such that a human user would not detect the alternating operation of the display of the image data and the capture of the image data.

Figure 6B:
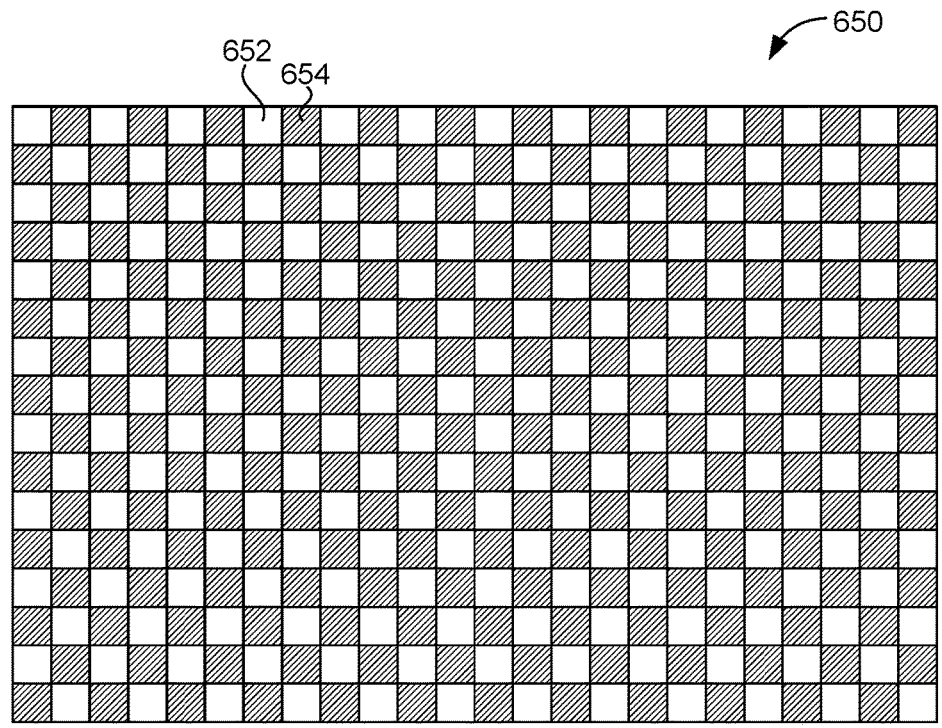
FIG. 6B schematically illustrates another enhanced integrated camera/display device that may be employed in the various embodiments.

FIG. 6B schematically illustrates another enhanced integrated camera/display (ICD) device 650 that may be employed in the various embodiments. The features and operation of ICD device 650 may be similar to that of ICD device 600, rather than interleaved rows or columns of display and camera pixels, a checkerboard pattern of alternating display and camera pixels is constructed. For example, as shown in FIG. 6B, the checkerboard pattern of ICD device 650 includes a camera pixel 652 adjacent a display pixel 654.

Figure 7:
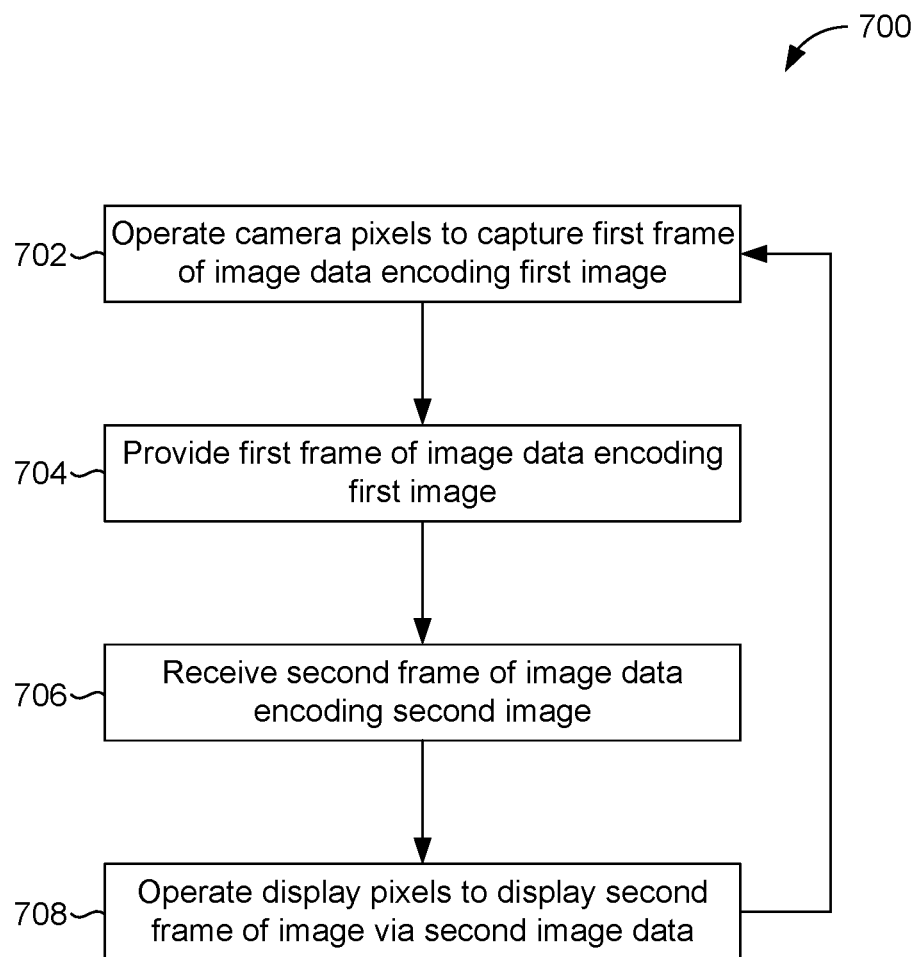
FIG. 7 illustrates one embodiment of a process flow for operating an integrated camera display device that is consistent with the various embodiments presented herein.

FIG. 7 illustrates one embodiment of a process flow for operating an integrated camera display device (ICD) that is consistent with the various embodiments presented herein. For example, process 700 may be employed to operate ICD device 600 of FIG. 6A or ICD device 650 of FIG. 6B, in alternating the operation of the camera and display pixels. It should be noted process 700 may be employed to operated any corresponding pair of displays and camera devices discussed herein in the service of enabling the enhanced VCS. At block 702, the camera pixels are operated to capture a first frame of image data encoding an image. At block 704, the first frame of image data is provided to a second display device. At block 706, a second frame of image data encoding a second image is received. At block 708, display pixels of a first display are operated to display the received second frame of image data.

Figure 8:
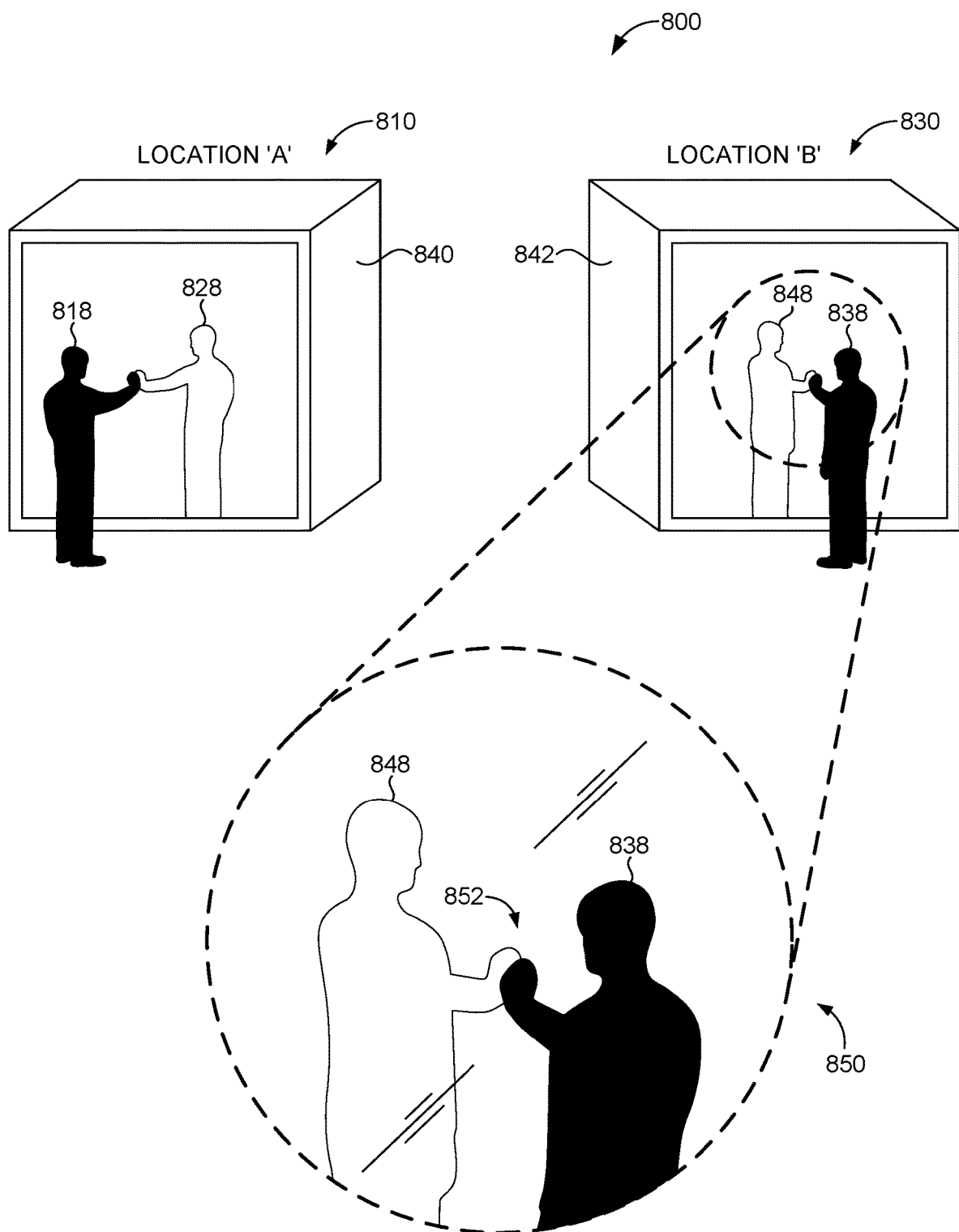
FIG. 8 schematically illustrates how users experience an enhanced telepresence via the various embodiments of videoconferencing apparatuses discussed herein.

FIG. 8 schematically illustrates how users experience an enhanced telepresence via the various embodiments of videoconferencing apparatuses discussed herein. System 800 includes a first VCA 810 in a first remote location and a second VCA 830 in a second remote location. The first and second VCAs 810/830 are communicatively coupled via a communication network, not depicted in FIG. 8. First user 818 is employing first VCA 810 and second user 838 is employing second VCA 830 to participate in an enhanced VCS, as discussed herein via the communicatively coupling of first and second VCAs 810/830. In some embodiments, first and second VCAs 810/830 may be projection-based VCAs, such as but not limited to any of VCAs 310, 330, or 510 of FIGS. 3A and 5A.

First VCA 810 is housed within at least a partially light tight first housing 840, while second VCA is housed within at least a partially light tight second housing 842. An image 828 of second user 838 is rear projected (via a projector housed within first housing 840) onto a projection screen of first VCA 810. The image data encoding image 828 is housed with second housing 842 and provided to the projector housed within first housing 840 via the communication network. Similarly, an image 848 of the first user 818 is rear projected onto a projection screen of the second VCA 830, via a projector housed within second VCA 830. The image data displaying image 848 was generated by a camera housed in first housing 840.

A close-up 850 is provided that shows the second user 838 interacting with the image 848 of first user 818. At least due to the mutual alignment of the FOVs of the cameras and projections screens of the respective first and second VCAs 810/830, and the resulting lack of camera blind spots in front of (i.e., the user's side) of the projection screens, users 818/838 are provided the enhanced telepresence experience of interacting with each other through a transparent barrier 852, as depicted in close-up 850.

As discussed throughout, and depicted visually in close-up 850, an enhanced telepresence experience may include the simulation that the users (or participants) of a VCS are interacting with one another through a transparent barrier 852, such as a glass window. Thus, the users 818/838 may experience "hand-to-hand" interactions, such as shown in close-up 850 of FIG. 8. That is, each user may touch a corresponding location on their individual location and receive visual feedback that the other user is touching their display at the same location. Thus, the user's experience a simulation of interactions through a transparent medium, such as, but not limited to, the above described "hand-to-hand" interaction shown in close-up FIG. 850. Note that the users 818/838 do not have to actually touch their displays. Rather, a similar effect results when the users position a portion of their body, such as a foot, hand, or other extension in close proximity to the display.

Illustrative Computing Device

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method for providing an enhanced telepresence, comprising:
    communicatively coupling a first video conference apparatus (VCA) that includes a first integrated display device with a second VCA that includes a second integrated display device via a communication network, wherein each integrated display device comprises a display panel having uniformly interleaved display pixels and camera pixels;
    initiating a videoconference session (VCS) between the first VCA and the second VCA;
    generating first image data via the first integrated display device camera pixels;
    providing first image data to the second VCA via the initiated VCS;
    causing display of first image data via the second integrated display device display pixels;
    receiving, by the first VCA via the initiated VCS, second image data from the second integrated display device camera pixels; and
    causing display of second image data via the first display device.

2. The method of claim 1, wherein the first integrated display device includes a transparent liquid crystal display (LCD) panel and the camera pixels are positioned alongside of the LCD panel that faces away from a first user of the first VCA.

3. The method of claim 1, wherein the first VCA further includes an optical system that is configured and arranged to substantially align the FOV of the first integrated display device camera pixels with the FOV of the first integrated display device.

4. The method of claim 1, wherein the first camera pixels are positioned such that a union of a FOV of each of the camera pixels substantially covers the FOV of the integrated display device.

5. The method of claim 1, wherein a display panel of the integrated display comprises camera pixels and display arranged into a checkered pattern, wherein the camera pixels and the display pixels do not overlap.

6. The method of claim 1, wherein the integrated display device comprises a partially transparent screen and each of the camera pixels and the display pixels mapped to a coordinate position, wherein image data is encoded with position data, wherein mapped pixels create a correspondence between camera pixels and display pixels relative to the partially transparent screen with a similar FOV.

7. The method of claim 5, wherein the camera pixels and the display pixels operate simultaneously.

8. An apparatus for providing enhanced telepresence experiences, the apparatus comprising:
an integrated display device, wherein the integrated display device comprises a display panel having uniformly interleaved display pixels and camera pixels
such that a field of view (FOV) of the camera pixels substantially covers a FOV of the integrated display device;
a network device enabled to receive first image data from a computing device that is external to the apparatus and transmit second image data generated by the integrated display device, by the camera pixels, to the computing device that is external to the apparatus; and
a processor device that is enabled to display images encoded in the received first image data on the display device via the display pixels.

9. The apparatus of claim 8, wherein the display panel of the integrated display device includes a light emitting diode (LED) panel comprising alternating rows or columns of camera pixels and display pixels.

10. The apparatus of claim 8, further comprising an optical system that is configured to combine image data from the camera pixels to generate an image that substantially aligns the FOV of the generated image with the FOV of the integrated display device.

11. The apparatus of claim 8, wherein the camera pixels are positioned such that a union of a FOV of each of the camera pixels substantially covers the FOV of the display device.

12. The apparatus of claim 8, wherein a display panel of the integrated display device comprises camera pixels and display arranged into a checkered pattern, wherein the camera pixels and the display pixels do not overlap.

13. The apparatus of claim 8, wherein the integrated display device comprises a partially transparent screen and each of the camera pixels and the display pixels are mapped to a coordinate position, wherein image data is encoded with position data, wherein mapped pixels create a correspondence between camera pixels and display pixels relative to the partially transparent screen with a similar FOV.

14. The apparatus of claim 12, wherein the camera pixels and the display pixels operate simultaneously.

15. One or more non-transitory computer readable storage medium storing computer-useable instructions that, when executed by one or more computing devices, causes the one or more computing devices to perform operations for providing an enhanced telepresence, the operations comprising:
generating first image data via an integrated display device, wherein the integrated display device comprises a display panel having uniformly interleaved display pixels and camera pixels;
receive second image data at the integrated display device, wherein the second image data is encoded to include position data; and
display the second image data via the display pixels of the integrated display device.

16. The computer readable storage medium of claim 15, wherein the integrated display device includes a transparent liquid crystal display (LCD) panel comprising each of the display pixels positioned adjacent to at least one camera pixel.

17. The computer readable storage medium of claim 15, wherein the first VCA further includes an optical system that is configured to combine image data from the camera pixels to generate an image that substantially aligns the FOV of the generated image with the FOV of the integrated display device.

18. The computer readable storage medium of claim 15, wherein the first camera pixels include is positioned such that a union of a FOV of each of the cameras included in the array of cameras substantially covers the FOV of the first display device.

19. The computer readable storage medium of claim 15, wherein the first display device includes a projection screen and a projector that is configured and arranged to project an image encoded in the second image data onto the projection screen.

20. The computer readable storage medium of claim 19, wherein the projection screen is a partially transparent projection screen and each of the first camera and the projector are positioned on a backside of projection screen that faces away from a first user of the first VCA.

* * * * *